US012083587B2

(12) United States Patent
Banerjee et al.

(10) Patent No.: US 12,083,587 B2
(45) Date of Patent: Sep. 10, 2024

(54) THREE-DIMENSIONAL PRINTER HEAD FOR PRINTING METAL ARTICLES

(71) Applicant: Vuecason Inc., Santa Monica, CA (US)

(72) Inventors: Dival Banerjee, Santa Monica, CA (US); Anirudh Bali, Santa Monica, CA (US); Maximilian Liese, Venice, CA (US)

(73) Assignee: Vuecason Inc., Santa Monica, CA (US)

( * ) Notice: Subject to any disclaimer, the term of this patent is extended or adjusted under 35 U.S.C. 154(b) by 10 days.

(21) Appl. No.: 18/152,637

(22) Filed: Jan. 10, 2023

(65) Prior Publication Data

US 2024/0226999 A1   Jul. 11, 2024

(51) Int. Cl.
*B22D 23/00* (2006.01)
*B22D 41/01* (2006.01)
*B22F 12/53* (2021.01)
*B33Y 30/00* (2015.01)

(52) U.S. Cl.
CPC ........... *B22D 23/003* (2013.01); *B22D 41/01* (2013.01); *B22F 12/53* (2021.01); *B33Y 30/00* (2014.12)

(58) Field of Classification Search
CPC ....... B22D 23/003; B22D 41/01; B22F 12/53; B33Y 30/00
See application file for complete search history.

(56) References Cited

U.S. PATENT DOCUMENTS

| 2016/0194233 A1* | 7/2016 | Van Pelt | ................. C03B 19/00 65/32.4 |
| 2020/0078859 A1* | 3/2020 | Cho | ....................... B22D 46/00 |

* cited by examiner

*Primary Examiner* — Anthony M Liang
*Assistant Examiner* — Danny N Kang
(74) *Attorney, Agent, or Firm* — Kristin Grant; Grant Attorneys at Law (57) ABSTRACT

The three-dimensional printer head for printing metal articles, the printer comprises a nozzle that is cylindrical and manufactured from a heat-resistant material with low electric conductivity, an embedded channel within the nozzle and running along a longitudinal length of the nozzle; a receiving space at a first end of the embedded channel in which a solid metal material is received; an extrusion space at a second end of the embedded channel from which a continuous bead of liquid or semisolid metal material is extruded, a feeder mechanism that continuously drives the solid metal material into the embedded channel through the receiving space, an induction coil surrounding an outer surface of the nozzle and extending over a substantial portion of the longitudinal length of the nozzle.

15 Claims, 8 Drawing Sheets

THREE-DIMENSIONAL PRINTER HEAD FOR PRINTING METAL ARTICLES

FIELD

This application relates to a three-dimensional printer head for printing metal materials and, more specifically, to a three-dimensional printer head for printing metal articles that provides a continuous bead of liquid or semisolid metal material.

BACKGROUND

An overarching goal of three-dimensional printing is the production of parts that may be difficult to produce using traditional manufacturing methods. For example, some parts may require specific features that traditional manufacturing methods cannot provide, such as an embedded cooling channel, overhangs, and internal pockets. Along with this, many high-performance alloys are difficult to manufacture, limiting what materials can be used to manufacture and ultimately reducing final part performance.

Traditional metal three-dimensional printing methods include powder metal printing and wire metal printing. Powder metal printing includes powder bed fusion, binder jetting, and directed energy deposition. Metal parts manufactured using powder metal often suffer from porosity and warping issues as a result of the topology of the powder particles and thermal energy input. Due to the printing process, printer build volumes and power removal from printed parts limit part complexity.

Wire metal printing results in lower porosity parts compared to powder metal printing. However, traditional wire metal printing does not constrain or precisely control the melt pool geometry or droplet size, resulting in wider bead widths, which create lower-resolution parts.

To make metal printing a viable manufacturing method for high-performance, complex parts, a wire-based metal three-dimensional printer head capable of controlling the flow of the deposition, resulting in a high-resolution bead, is needed.

SUMMARY

In an embodiment, a three-dimensional printer head for printing metal articles is disclosed. The three-dimensional printer head comprising a nozzle that is heat resistant and with low electric conductivity; an embedded channel within the nozzle and running along a longitudinal length of the nozzle; a receiving space at a first end of the embedded channel in which a solid metal material is received; an extrusion space at a second end of the embedded channel from which a continuous bead of liquid or semisolid metal material is extruded; a feeder mechanism that continuously drives the solid metal material into the embedded channel through the receiving space; an induction coil surrounding an outer surface of the nozzle and extending over a substantial portion of the longitudinal length of the nozzle; a coil driver modulating the induction coil at a frequency sufficient to produce a magnetic field capable of passing through the nozzle to heat the solid metal material within the embedded channel inductively; and the heat produced by the inductive coil is sufficient to produce the continuous bead of a liquid or semisolid metal material exiting the nozzle at the extrusion space.

BRIEF DESCRIPTION OF THE DRAWINGS

The drawings described below are for illustrative purposes and are not necessarily drawn to scale. The drawings are not intended to limit the scope of the disclosure in any way. Wherever possible, the same or like reference numbers are used throughout the drawings to refer to the same or like parts.

DETAILED DESCRIPTION

Figure 1:
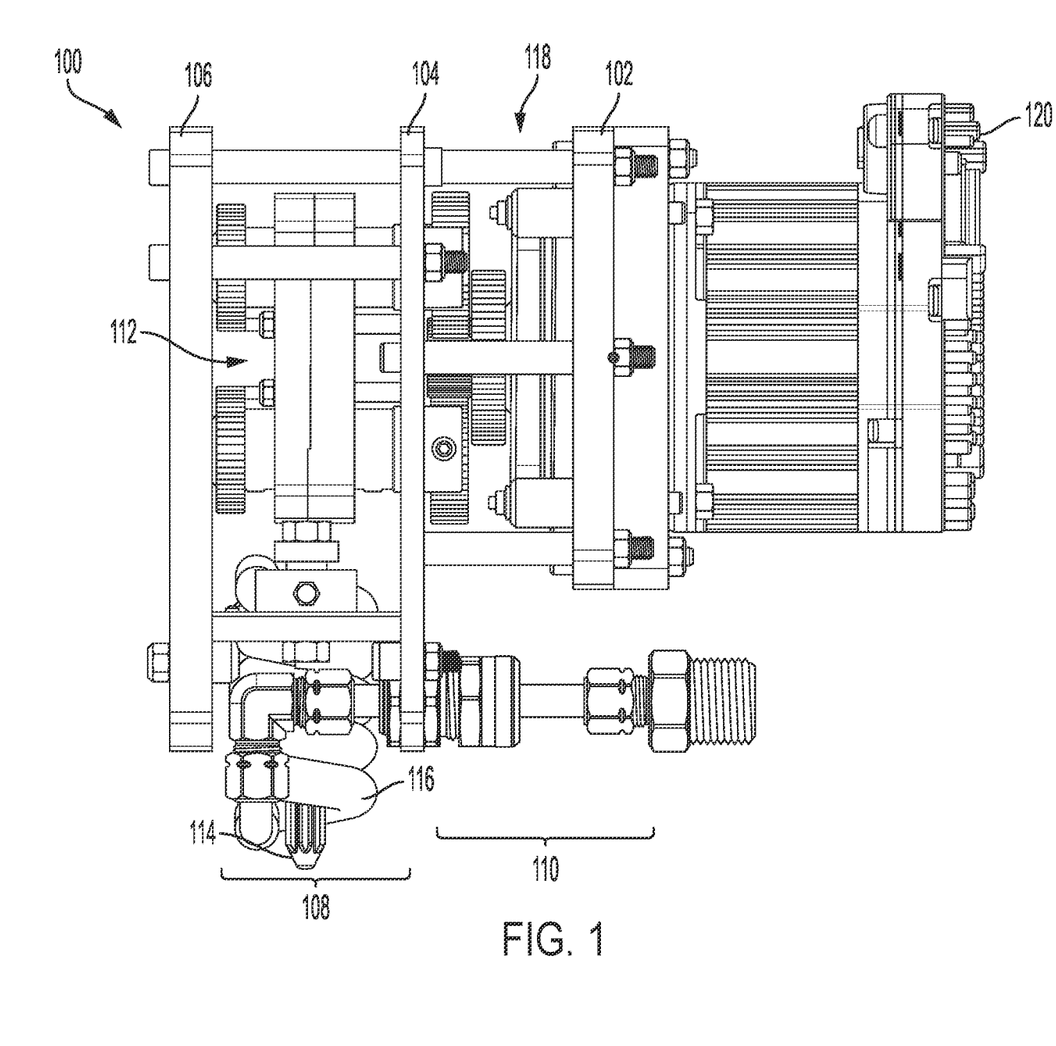
FIG. 1 is a side view of a three-dimensional printer head for printing metal articles according to the embodiments disclosed herein.

FIG. 1 is a side view of a three-dimensional printer head 100 for printing metal articles according to the embodiments disclosed herein.

The three-dimensional printer head 100 may comprise a back plate 102, an intermediate plate 104, and a front plate 106.

The front plate 106 is coupled to the intermediate plate 104 with an offset that defines a first area 108 between the front and intermediate plates 106, 104. Similarly, the intermediate plate 104 is coupled to the back plate 102 with an offset that defines a second area 110.

The three-dimensional printer head 100 may include a feeder mechanism 112, a nozzle 114, and an induction coil 116 mounted to the intermediate plate 104 within the first area 108. Similarly, the three-dimensional printer head 100 may include a gearbox mechanism 118 mounted to the intermediate and back plates 104, 102 within the second area 110.

Lastly, the three-dimensional printer head 100 may include a motor 120 mounted to the back plate 102.

The motor 120 communicates mechanically with the gearbox mechanism 118 through the back plate 102 to provide rotational torque to the gearbox mechanism 118. The gearbox mechanism 118, in turn, communicates mechanically with the feeder mechanism 112 through the intermediate plate 104 to provide a translated rotation torque to the feeder mechanism 112.

Figure 2:
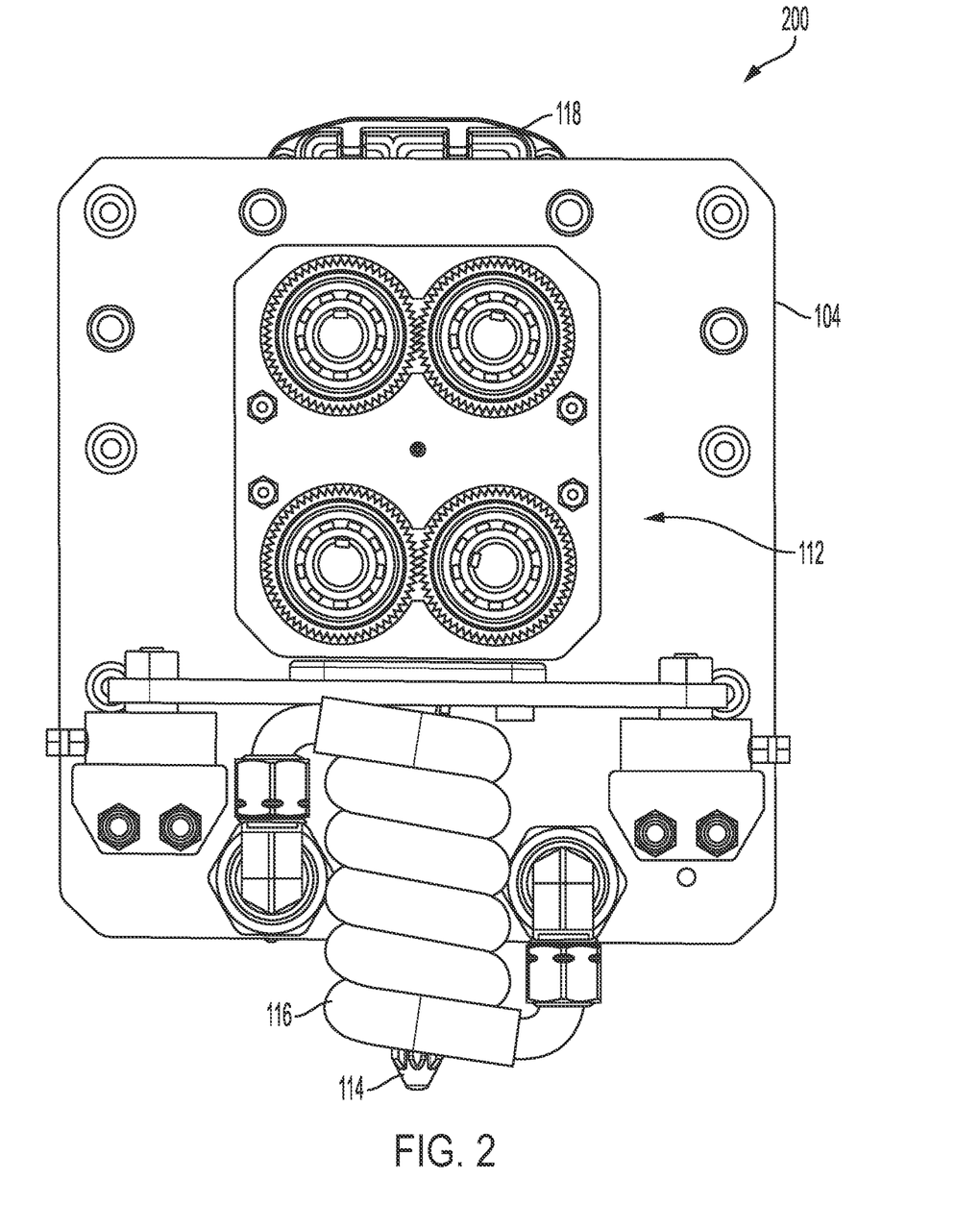
FIG. 2 is a front view of the first area of the three-dimensional printer head for printing metal articles according to the embodiments disclosed herein.

FIG. 2 is a front view of the first area 200 of the three-dimensional printer head 100 for printing metal articles according to the embodiments disclosed herein. The feeder mechanism 112 is positioned above and aligned with the nozzle 114. This positioning and alignment enable the feeder mechanism 112 to use the translated rotational torque, as provided by the gearbox mechanism 118, to provide a controlled and continuous feed of a solid metal material into the nozzle 114.

The nozzle 114 and the induction coil 116 provide for the heating and melting of the solid metal material provided by the feeder mechanism 112. The nozzle 114 subsequently extrudes a bead of liquid or semisolid metal material used to print metal articles.

Figure 3:
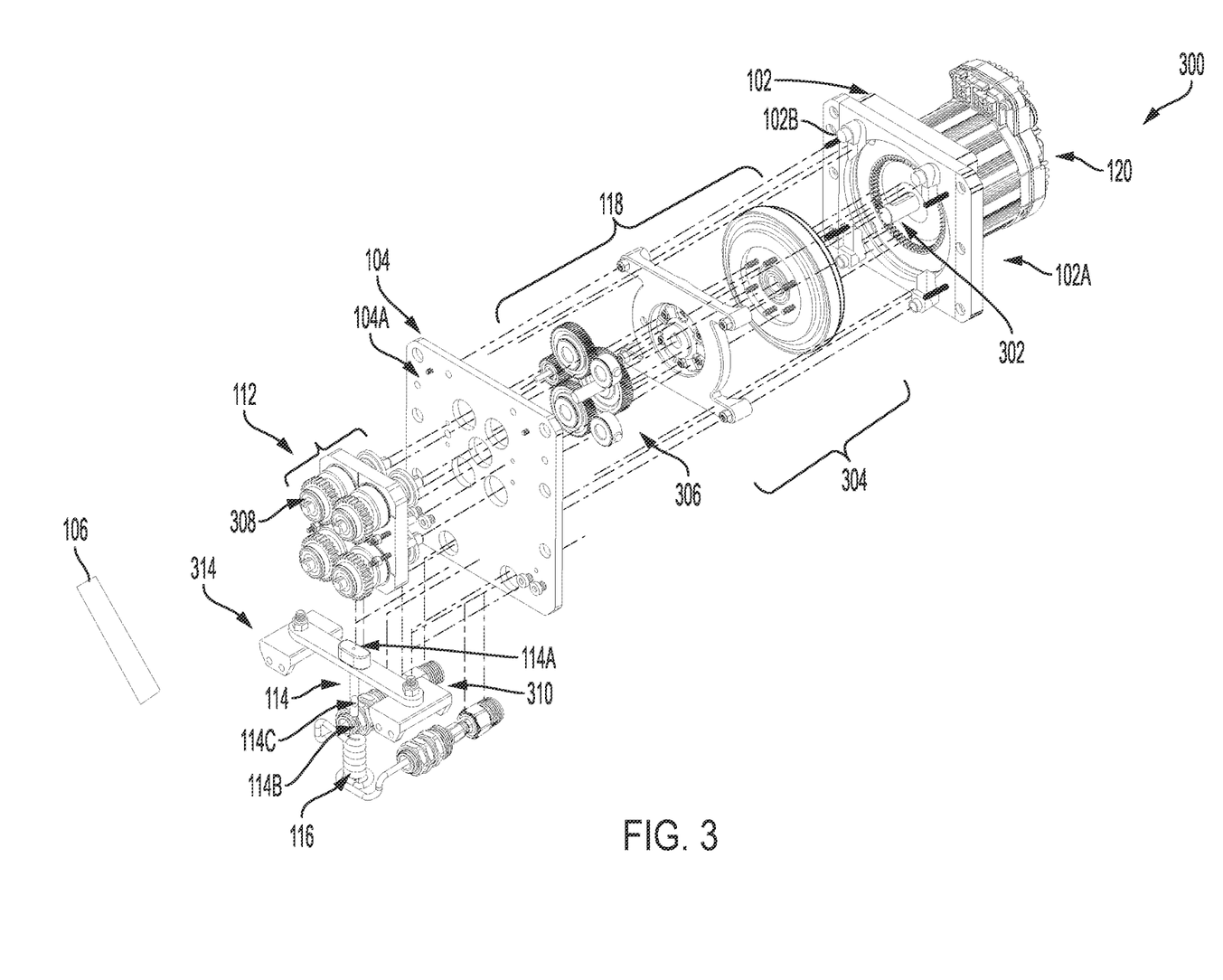
FIG. 3 is an exploded perspective view of a three-dimensional printer head for printing metal articles according to the embodiments disclosed herein.

FIG. 3 is an exploded perspective view 300 of a three-dimensional printer head for printing metal articles according to the embodiments disclosed herein.

The motor 120 may be any motor known to a person of ordinary skill in the art that provides a controlled and continuous rotational torque, including direct current motors, alternating current motors, and special motors. Irrespective of the motor type, the rotational torque may be delivered through the back plate 102 by a drive shaft 302 that is driven by and extends from the motor 120.

The gearbox mechanism 118 may be any gearbox known to one of ordinary skill in the art that provides for a translation of rotational torque, including concentric, parallel, right angle, shaft mount, or any combination thereof.

As shown in FIG. 3, an exemplary embodiment of the gearbox mechanism 118 may include a gearbox reduction component 304 and a gear train 306. The gearbox reduction component 304 may be designed to provide a reduction of the rotational speed originally provided by the drive shaft 302 of the motor 120. The gear train 306 may be designed to provide one or more high-speed and low-speed combinations of output rotational torque to the feeder mechanism 112 using the translated rotational torque provided by the gearbox mechanism 118.

As shown in FIG. 3, in the exemplary embodiment, the motor 120 and the gearbox mechanism 118 are each mounted on opposite sides of the back plate 102. Specifically, the motor 120 is mounted on a back surface 102A of the back plate 102 while the gearbox is mounted to an opposite front surface 102B of the back plate 102. The drive shaft 302 extends from the back surface 102A to the front surface 102B through a hole in the back plate 102 to engage with the gearbox mechanism 118.

As further shown in FIG. 3, in the exemplary embodiment, the feeder mechanism 112 is mounted on a front surface 104A of the intermediate plate 104 to engage with the gearbox mechanism 118 from area 110. Specifically, the gear train 306 extends through a hole in the intermediate plate 104 to engage with the feeder mechanism 112.

The feeder mechanism 112 may include a plurality of rollers 308 arranged in a configuration designed to drive the solid metal material into the nozzle 114. Any combination of high-speed and low-speed rotational torques from the gear train 306 may drive the plurality of rollers 308.

The nozzle 114 may be composed of any material with low electric conductivity known to a person of ordinary skill in the art to be heat resistant, including ceramics, refractory materials, or any combination of these and other materials. The material of the nozzle 114 may be a solid material within which an embedded channel may be integrated. Alternatively, the material of the nozzle may be porous, within which an embedded channel may be integrated.

The nozzle 114 may be cylindrically shaped to encompass an embedded channel (not shown) that runs along the longitudinal length of the nozzle 114. Alternatively, the nozzle 114 may have any other shape capable of providing a longitudinal length in which an embedded channel may be integrated, including rectangular, triangular, and polygonal shapes.

The nozzle 114 may be cast, sintered, machined, or 3D printed from a heat-resistant material with low electric conductivity as a method of manufacture. Moreover, the nozzle 114 may be manufactured from either a single piece of material or multiple pieces of material bonded together.

Irrespective of its shape, composition, or method of manufacture, the nozzle 114 is configured to receive the solid metal material at a first end 114A and to extrude a liquid or semisolid metal material at an opposite second end 114B, the solid metal material passing through the nozzle 114 via the embedded channel.

The induction coil 116 functions to inductively heat the solid metal materials received within the nozzle 114. The inductive coil 116 may be made of any conductive material known to a person of ordinary skill in the art. A variable magnetic field is created by passing an alternating current through the induction coil 116. The induction coil 116 is specifically shaped and positioned to efficiently expose the nozzle 114 to the generated magnetic field, thereby heating the solid metal material within the embedded channel of the nozzle 114. With induction, the generated magnetic field has a weak response with the nozzle and heats the wire 412 within the channel 602.

The conductive material composing the induction coil 116 may be formed with a solid core or tubing with a hollow core. The profile of the solid core or tubing can be circular or polygonal.

In an exemplary embodiment, the conductive material composing the induction coil 116 is made from a tubing and wrapped in a coil shape. The inner diameter of the induction coil may have a diameter equal to or greater than 4 millimeters.

Returning to FIG. 2, the nozzle 114 is mounted on the front surface 104A of the intermediate plate 104, below the feeder mechanism 112. Specifically, the nozzle 114 is mounted to align with the plurality of rollers 308 to receive the solid metal material driven down through the feeder mechanism 112. A pair of nozzle mounting brackets 310 are provided that allow for the alignment of the nozzle 114 with the feeder mechanism 112.

The induction coil 116 is similarly mounted on the front surface 104A of the intermediate plate 104. Specifically, the induction coil 116 is shaped to surround an outer surface 114C of the nozzle 114 and extend over a substantial portion of the longitudinal length of the nozzle 114.

Moreover, a portion of the induction coil 116 may include additional coil loops that overlap with another coil loop. These overlapping coil loops focus the generated magnetic field around the induction coil portion where the loops overlap.

In one exemplary embodiment, the induction coil 116 included overlapping coil loops proximate to the extrusion space 508 of the nozzle 114.

This overlapping of coil loops focuses the magnetic field generated by the induction coil 116. The area where the magnetic field is focused will create the hottest point. As a result, in the exemplary embodiment, the hottest point of the melt pool will be proximate to the extrusion space 508 of the nozzle 114.

Figure 4A:
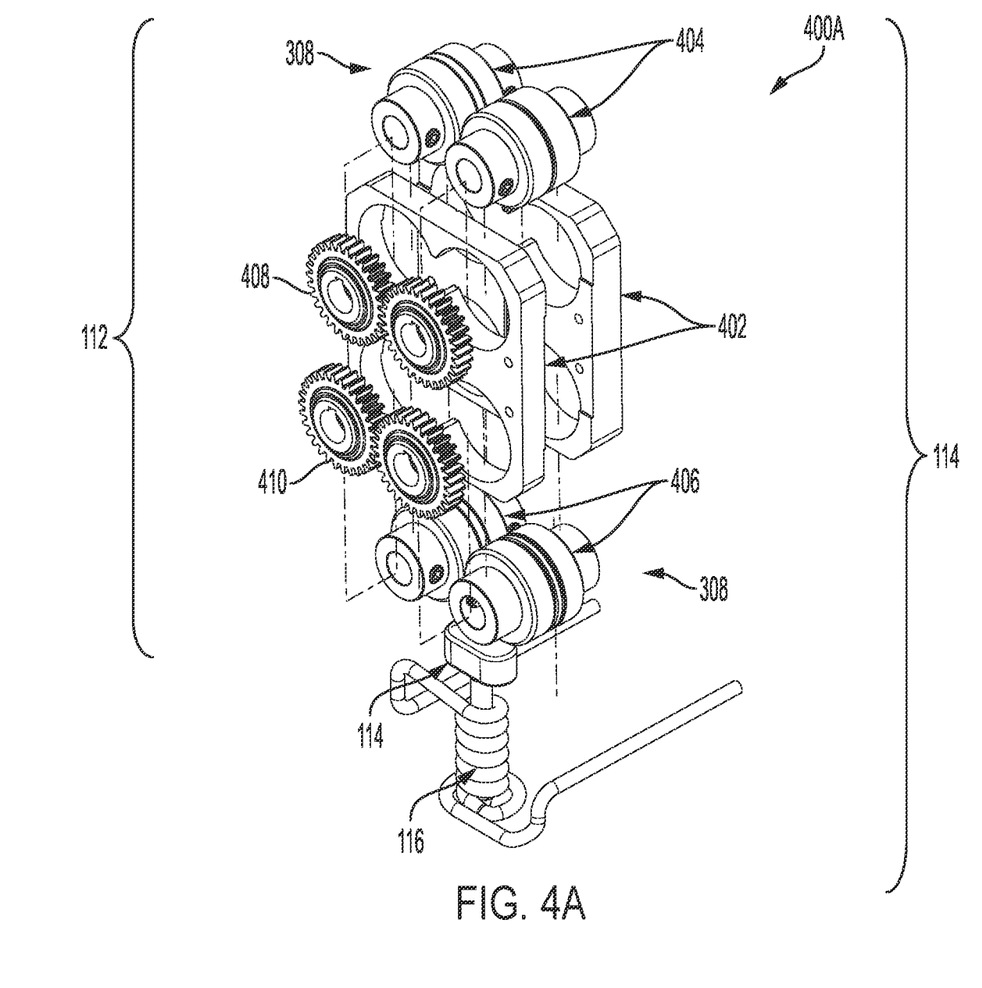
FIG. 4A is an exploded view of a feeder mechanism for a three-dimensional printer head for printing metal articles according to the embodiments disclosed herein.

FIG. 4A is an exploded view 400A of a feeder mechanism 112 for a three-dimensional printer head for printing metal articles according to the embodiments disclosed herein. The feeder mechanism 112 may be comprised of a wire guide block 402 through which a plurality of rollers 308 passes through. The plurality of rollers 308 may include an upper pair of rollers 404 and a lower pair of rollers 406, the lower pair of rollers 406 positioned below the upper pair of rollers 404.

The feeder mechanism 112 may further include an upper pair of gears 408 and a lower pair of gears 410. The upper pair of gears 408 is attached to the upper pair of rollers 404 as to couple each of the upper pair of rollers 404 to one another. Similarly, the lower pair of gears 410 is attached to the lower pair of rollers 406 as to couple each of the lower pair of rollers 406 to one another.

Figure 4B:
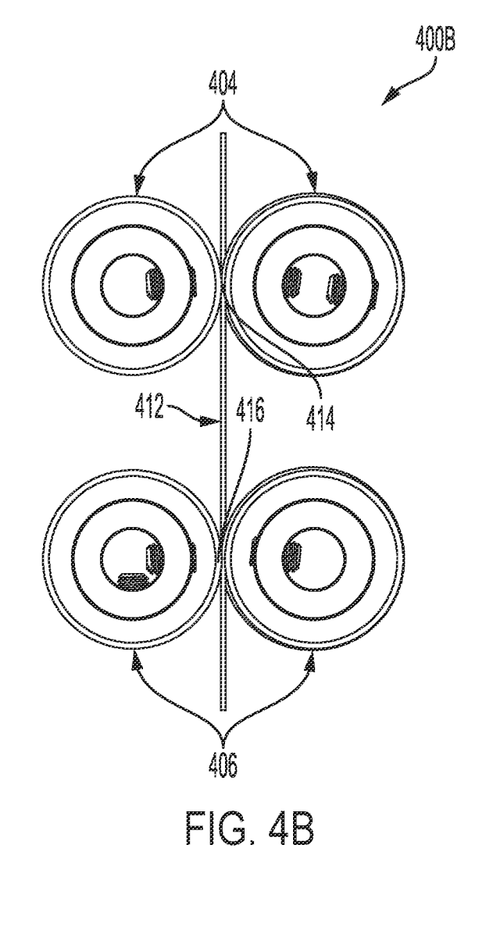
FIG. 4B is a front view of the upper and lower pair of rollers showing the path of a wire guided through the feeder mechanisms for a three-dimensional printer head for printing metal articles according to the embodiments disclosed herein.

FIG. 4B is a front view 400B of the upper and lower pairs of rollers 404, 406 showing a path of the wire 412 through the feeder mechanisms 112 for a three-dimensional printer head for printing metal articles according to the embodiments disclosed herein. As shown, the upper pair of rollers 404 interacts with a wire 412 at an upper point of contact 414, and the lower pair of rollers 406 interacts with the wire 412 at a lower point of contact 416. In operation, the wire 412 form of a solid metal material enters the feeder mechanism 112 at the upper point of contact 414 and exits at the lower point of contact 416. The upper and lower points of contact 414, 416 interact with the wire 412 to feed it down through the feeder mechanisms 112.

Figure 4C:
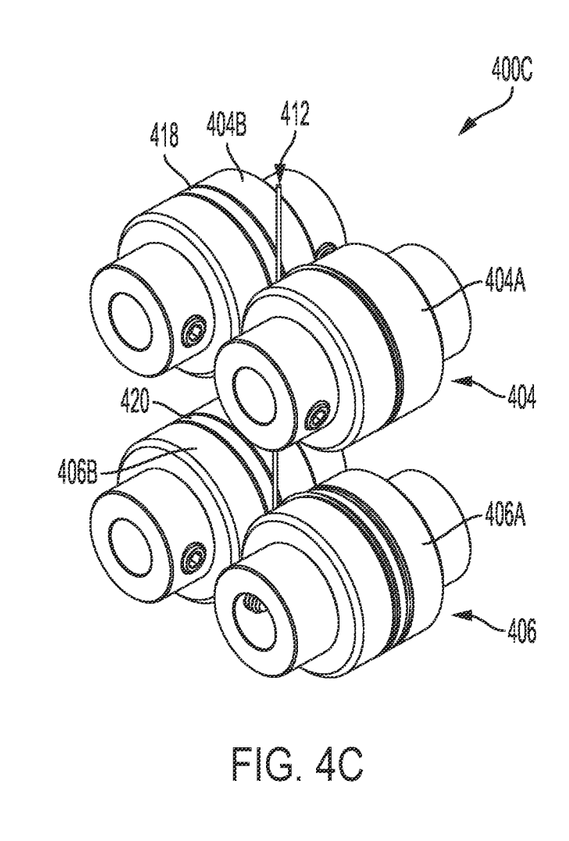
FIG. 4C is a perspective view of the upper and lower pairs of rollers showing a path of the wire guided through the feeder mechanisms for a three-dimensional printer head for printing metal articles according to the embodiments disclosed herein.

FIG. 4C is a perspective view 400C of the upper and lower pairs of rollers 404, 406 showing a path of the wire 412 through the feeder mechanisms 112 for a three-dimensional printer head for printing metal articles according to the embodiments disclosed herein. As shown, the upper pair of rollers 404 may be comprised of an upper right roller 404A and an upper left roller 404B. Similarly, the lower pair of rollers 406 may be comprised of a lower right roller 406A and a lower left roller 406B. The upper left roller 404B may include an upper channel 418 through which the wire 412 is guided at the upper point of contact 414. Similarly, the lower left roller 406B may include a lower channel 420 through which the wire 412 is guided at the lower point of contact 416. The upper channel 418 and the lower channel 420 may be offset from one another to allow the wire to be wrapped around the upper right roller 404A and the lower right roller 406A.

In one embodiment, as a result of wrapping the wire 412 around the upper and lower right rollers 404A, 406A, the feeder mechanism 112 is capable of sustaining an extrusion force of 3.6 kN to the wire 412 while feeding the wire 412 into the receiving space 506 of the nozzle 114. This applied force is sufficient to create a continuous bead of semisolid or liquid metal through the channel 602 and out of the extrusion space 508 of the nozzle 114.

In another exemplary embodiment, the inner diameter of induction coil 116 is at most ten times larger than the diameter of the wire 412. This ratio provides for the efficient heating of the wire 412 as it transitions through the channel 602 of the nozzle 114 to transform the wire 412 into a semisolid or liquid.

Figure 5:
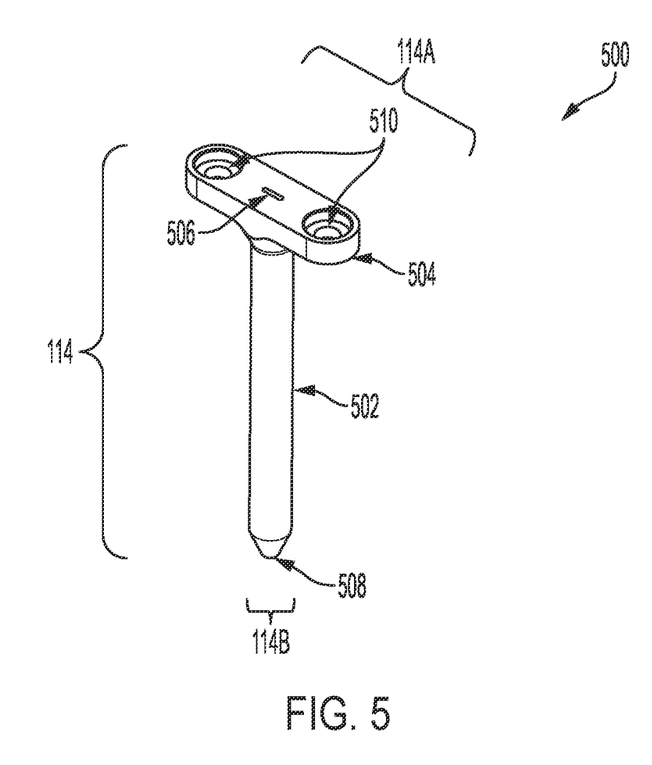
FIG. 5 is a perspective view of a nozzle for a three-dimensional printer head for printing metal articles according to the embodiments disclosed herein.

FIG. 5 is a perspective view 500 of a nozzle 114 for a three-dimensional printer head for printing metal articles according to the embodiments disclosed herein.

The nozzle 114 may be comprised of a barrel portion 502 connected to mounting flange 504. The barrel portion 502 may have a cylindrical shape extending downward from the mounting flange 504. The mounting flange 504 includes a receiving space 506 at the first end 114A of the nozzle 114 where the wire of solid metal material 412 (not shown) is received. The barrel portion 502 includes an extrusion space 508 at the second end 114B of the nozzle 114 from which a continuous bead of liquid or semisolid metal material may be extruded. The receiving and extrusion spaces 506, 508 are each in communication with opposite ends of the embedded channel (not shown).

The second end 114B of the nozzle 114 may be tapered to provide for an extrusion space 508 that is cone-shaped.

The mounting flange 504 may include a pair of receiving holes 510 that interface with the pair of nozzle mounting brackets 310 to mount the nozzle 114 to the intermediate plate 104.

Figure 6:
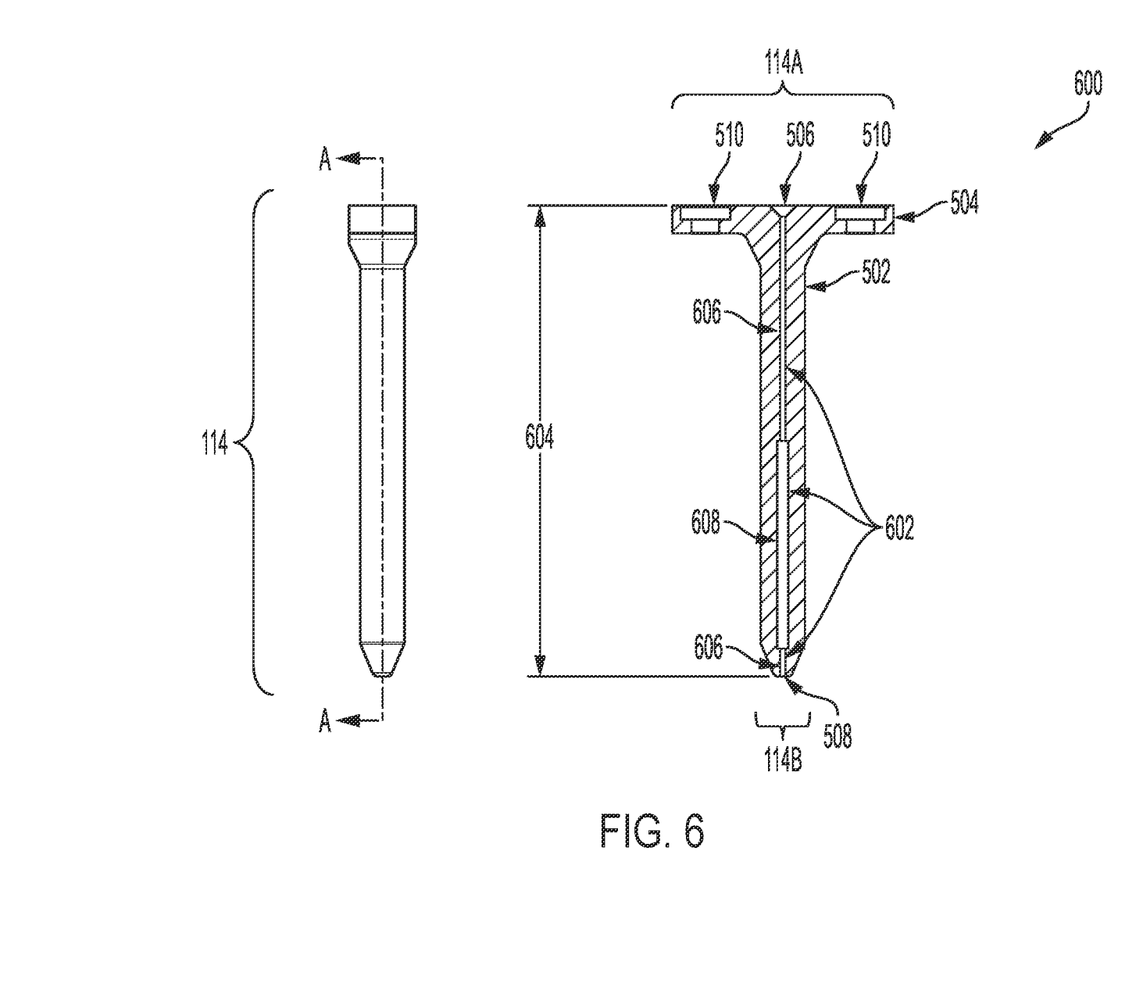
FIG. 6 is a cross-sectional view of a nozzle for a three-dimensional printer head for printing metal articles according to the embodiments disclosed herein.

FIG. 6 is a cross-sectional view 600 of a nozzle 114 for a three-dimensional printer head for printing metal articles according to the embodiments disclosed herein.

As shown, the nozzle 114 includes an embedded channel 602 running along a longitudinal length 604 of the nozzle 114. Specifically, the embedded channel 602 runs within the nozzle 114 from the receiving space 506 down to the extrusion space 508.

The embedded channel 602 may have a diameter 606 that is greater than or equal to the diameter of the wire 412, which is fed into the receiving space 506.

Alternatively, the embedded channel 602 may have a diameter that varies along the longitudinal length 604 of the nozzle 114. Specifically, the embedded channel may have a first diameter 606 proximate to the receiving and extrusion spaces 506, 508. A portion of the embedded channel 602 positioned between the receiving and extrusion spaces 506, 508 may transition to a second diameter 608, the second diameter 608 being greater than the first diameter 606.

The friction between the semisolid or liquid metal and the embedded channel 602 helps to prevent the flow of the semisolid or liquid metal from the extrusion space 508 without the presence of an extrusion force at the receiving space 506.

Figure 7:
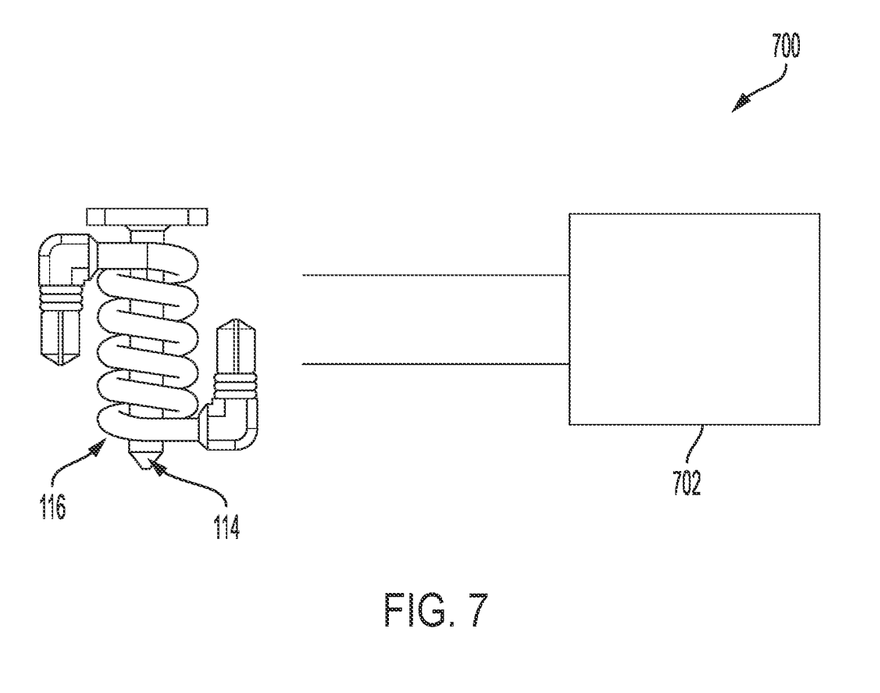
FIG. 7 is a diagram of a coil driver connected to an induction coil in a three-dimensional printer head for printing metal articles according to the embodiments disclosed herein.

FIG. 7 is a diagram 700 of a coil driver 702 connected to an induction coil 116 in a three-dimensional printer head for printing metal articles according to the embodiments disclosed herein.

The coil driver 702 modulates the induction coil 116 at a frequency sufficient to produce a magnetic field capable of passing through the nozzle 114 to inductively heat the solid metal material within the embedded channel 602.

In an exemplary embodiment, the coil driver 702 drives the induction coil 116 at a modulation frequency between 100 kHz and 500 kHz and at a power level between 1 KW and 10 kW.

What is claimed is:

1. A three-dimensional printer head for printing metal articles, the printer head comprising:
   a nozzle that is heat resistant and with low electric conductivity;
   an embedded channel within the nozzle and running along a longitudinal length of the nozzle;
   a receiving space at a first end of the embedded channel in which a solid metal material is received;
   an extrusion space at a second end of the embedded channel from which a continuous bead of liquid or semisolid metal material is extruded;
   a feeder mechanism that continuously drives the solid metal material into the embedded channel through the receiving space;

an induction coil surrounding an outer surface of the nozzle and extending over a portion of the longitudinal length of the nozzle;

a coil driver modulating the induction coil at a frequency sufficient to produce a magnetic field capable of passing through the nozzle to heat the solid metal material within the embedded channel inductively; and the heat produced by the inductive coil is sufficient to produce the continuous bead of a liquid or semisolid metal material exiting the nozzle at the extrusion space.

2. The three-dimensional printer head for printing metal articles of claim 1, wherein the nozzle is solid.

3. The three-dimensional printer head for printing metal articles of claim 1, wherein the nozzle is porous.

4. The three-dimensional printer head for printing metal articles of claim 1, wherein the nozzle is cylindrical.

5. The three-dimensional printer head for printing metal articles of claim 1, wherein the coil driver drives the induction coil at a modulation frequency between 100 KHz and 500 kHz and a power level between 1 KW and 10 kW.

6. The three-dimensional printer head for printing metal articles of claim 1, wherein a diameter of the embedded channel is greater than or equal to a width of the solid metal material received in the receiving space.

7. The three-dimensional printer head for printing metal articles of claim 1, wherein the extrusion space at the second end of the nozzle is cone-shaped.

8. The three-dimensional printer head for printing metal articles of claim 1, wherein the feeder mechanism is comprised of a gearbox driven by a motor that feeds a wire of the solid metal material through a guide block into the receiving space.

9. The three-dimensional printer head for printing metal articles of claim 8, wherein the guide block includes an upper pair of rollers and a lower pair of rollers that drive the wire into the receiving space.

10. The three-dimensional printer head for printing metal articles of claim 9, wherein the upper pair of rollers is comprised of an upper right roller and an upper left roller, and the lower pair of rollers is comprised of a lower right roller and a lower left roller; and wherein the upper pair of rollers and the lower pair of rollers each include a channel that guides the wire through the guide block.

11. The three-dimensional printer head for printing metal articles of claim 10, wherein the wire is wrapped around the upper right roller and the lower right roller while guided through the guide block.

12. The three-dimensional printer head for printing metal articles of claim 9, wherein the feeder mechanism further comprising a gearbox that translates a torque from the motor to the upper pair of rollers and the lower pair of rollers in the guide block.

13. The three-dimensional printer head for printing metal articles of claim 1, wherein the induction coil is composed of conductive material with a solid core.

14. The three-dimensional printer head for printing metal articles of claim 1, wherein the induction coil is composed of a conductive material tubing with a hollow core.

15. The three-dimensional printer head for printing metal articles of claim 14, wherein an inner diameter of the induction coil is equal to or greater than 4 millimeters.

* * * * *